(12) United States Patent
Lee

(10) Patent No.: US 9,954,379 B2
(45) Date of Patent: *Apr. 24, 2018

(54) APPARATUS, SYSTEM, AND METHOD OF PREVENTING BATTERY RACK DAMAGE BY MEASURING VOLTAGE

(71) Applicant: LG CHEM, LTD., Seoul (KR)

(72) Inventor: Jongbum Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 220 days.

This patent is subject to a terminal disclaimer.

(21) Appl. No.: 14/649,347

(22) PCT Filed: Nov. 12, 2014

(86) PCT No.: PCT/KR2014/010869
§ 371 (c)(1),
(2) Date: Jun. 3, 2015

(87) PCT Pub. No.: WO2015/126035
PCT Pub. Date: Aug. 27, 2015

(65) Prior Publication Data
US 2015/0372517 A1    Dec. 24, 2015

(30) Foreign Application Priority Data

Feb. 20, 2014  (KR) .................. 10-2014-0019882
Nov. 12, 2014  (KR) .................. 10-2014-0156961

(51) Int. Cl.
*H02J 7/00* (2006.01)
*H02H 7/18* (2006.01)
(Continued)

(52) U.S. Cl.
CPC ............. *H02J 7/0034* (2013.01); *B60L 11/18* (2013.01); *H01M 10/4207* (2013.01);
(Continued)

(58) Field of Classification Search
CPC ............. H02J 7/0031; H02J 2007/004; H02J 2007/0037; Y02E 60/12; H01M 10/48
(Continued)

(56) References Cited

U.S. PATENT DOCUMENTS 5,157,320 A * 10/1992 Kuriloff ................ H02J 7/0006
320/125
6,239,579 B1 * 5/2001 Dunn .................. G01R 31/3658
320/119
(Continued)

FOREIGN PATENT DOCUMENTS

JP    7-067214 A    3/1995
JP    8-168172 A    6/1996
(Continued)

OTHER PUBLICATIONS

Written Opinion issued in PCT/KR2014/010869, dated Feb. 27, 2015.
(Continued)

*Primary Examiner* — Yalkew Fantu
*Assistant Examiner* — Mohammed J Sharief
(74) *Attorney, Agent, or Firm* — Birch, Stewart, Kolasch & Birch, LLP

(57) ABSTRACT

The present invention relates to an apparatus, a system, and a method of preventing a battery rack from being damaged by measuring a voltage, which, when a battery module is abnormally connected with a relay in some battery racks in installing the relay, which conducts or blocks a current flowing in the battery rack including a plurality of battery modules, so that a voltage smaller than a predetermined voltage limit value is applied to the battery rack, prevent a short-circuit phenomenon, by controlling an operation state of the relay before the battery rack and the relay form a short circuit.

11 Claims, 6 Drawing Sheets

(51) Int. Cl.
    *H01M 10/42*     (2006.01)
    *H01M 10/48*     (2006.01)
    *B60L 11/18*     (2006.01)
    *B60L 3/00*     (2006.01)

(52) U.S. Cl.
    CPC ............ *H01M 10/482* (2013.01); *H02H 7/18* (2013.01); *H02J 7/007* (2013.01); *B60L 3/0046* (2013.01); *B60L 11/1853* (2013.01); *B60L 2240/547* (2013.01); *H01M 10/425* (2013.01); *Y02T 10/705* (2013.01)

(58) Field of Classification Search
    USPC ........................................................ 320/134
    See application file for complete search history.

(56) References Cited

U.S. PATENT DOCUMENTS

| | | | |
|---|---|---|---|
| 2007/0075684 A1* | 4/2007 | Liu | H02J 7/0031 320/128 |
| 2007/0139005 A1 | 6/2007 | Osawa | |
| 2008/0185999 A1 | 8/2008 | Matsukawa et al. | |
| 2009/0085519 A1* | 4/2009 | Kim | H02J 7/0011 320/134 |
| 2010/0277845 A1 | 11/2010 | Park et al. | |
| 2011/0049977 A1 | 3/2011 | Onnerud et al. | |
| 2012/0007547 A1 | 1/2012 | Kim | |
| 2012/0188086 A1* | 7/2012 | Xie | G01R 31/3606 340/636.18 |
| 2012/0274142 A1* | 11/2012 | Tinglow | H02J 7/0026 307/77 |
| 2013/0033794 A1* | 2/2013 | Baek | H02H 7/18 361/93.9 |
| 2013/0116875 A1 | 5/2013 | Oh et al. | |
| 2015/0188346 A1* | 7/2015 | Oku | H02J 7/0029 320/107 |
| 2016/0020629 A1* | 1/2016 | Lee | H01M 10/482 320/164 |

FOREIGN PATENT DOCUMENTS

| | | |
|---|---|---|
| JP | 2007-89240 A | 4/2007 |
| KR | 10-2012-0005368 A | 1/2012 |
| KR | 10-2012-0137658 A | 12/2012 |
| KR | 10-2013-0015652 A | 2/2013 |

OTHER PUBLICATIONS

Extended European Search Report for Appl. No. 14868728.8 dated Sep. 22, 2016.
Korean Office Action for Appl. No. 10-2014-0156961 dated Feb. 4, 2016 (w/ English translation).

* cited by examiner

APPARATUS, SYSTEM, AND METHOD OF PREVENTING BATTERY RACK DAMAGE BY MEASURING VOLTAGE

TECHNICAL FIELD

This application claims priority to and the benefit of Korean Patent Application No. 10-2014-0019882 filed in the Korean Intellectual Property Office on Feb. 20, 2014, and Korean Patent Application No. 10-2014-0156961 filed in the Korean Intellectual Property Office on Nov. 12, 2014, the entire contents of which are incorporated herein by reference.

The present invention relates to an apparatus, a system, and a method of preventing a battery rack from being damaged by measuring a voltage, and more particularly, an apparatus, a system, and a method of preventing a battery rack from being damaged by measuring a voltage, which, when a battery module is abnormally connected with a relay in some battery racks in installing the relay, which conducts or blocks a current flowing in the battery rack including a plurality of battery modules, so that a voltage smaller than a predetermined voltage limit value is applied to the battery rack, prevent a short-circuit phenomenon that may occur in the battery rack in which the relay is abnormally installed, by controlling an operation state of the relay before the battery rack and the relay form a short circuit, thereby preventing the battery rack from being damaged.

BACKGROUND ART

Recently, interest in an electric product, which can be driven by using a rechargeable battery, has increased due to depletion of fossil energy, and environmental pollution due to use of fossil energy. Accordingly, in view of technical development and demands for a mobile device, an electric vehicle (EV), a hybrid vehicle (HV), an energy storage system (ESS), and an uninterruptible power supply (UPS) have increased, demands for a rechargeable battery as an energy source have been rapidly increased.

The rechargeable battery attracts attention as a new energy source that is environmentally-friendly and with improved energy efficiency in that it is possible to innovatively decrease use of fossil energy, which is the primary advantage, while not generating a by-product when using energy.

Particularly, a rechargeable battery used in an EV, an HV, an ESS, and a UPS is configured by connecting a plurality of battery racks including a plurality of battery modules in order to charge or discharge high-output and large capacitance power. As described above, a relay control technique for controlling a current flowing in the battery rack by installing a relay is provided in the battery rack, in which high-output and large capacitance power is frequently charged or discharged, in order to protect the battery rack from overcharging, overdischarging, and a surge current.

However, when the relay installed by an installer for protecting the battery rack is abnormally installed to configure a closed circuit, in which only the relay and the battery rack are connected, without an external load, a short-circuit phenomenon occurs in the battery rack. When the short-circuit phenomenon occurs in some battery racks among the plurality of battery racks connected to secure high capacitance, a charging speed of each battery rack varies due to capacitance deviation between the battery racks, and thus the first charged battery rack is overcharged, so that there is a problem in that the battery rack is damaged due to overheating or swelling.

In this respect, the present inventors completed an apparatus, a system, and a method of preventing a battery rack from being damaged by measuring a voltage, which, when a battery module is abnormally connected with a relay in some battery racks in installing the relay, which conducts or blocks a current flowing in the battery rack including a plurality of battery modules, so that a voltage smaller than a predetermined voltage limit value is applied to the battery rack, prevent a short-circuit phenomenon that occurs in the battery rack in which the relay is abnormally installed, by controlling an operation state of the relay before the battery rack and the relay form a short circuit, thereby preventing the battery rack from being damaged.

DETAILED DESCRIPTION OF THE INVENTION

Technical Problem

An object of the present invention is to provide an apparatus, a system, and a method of preventing a battery rack from being damaged by measuring a voltage, which, when a battery module is abnormally connected with a relay in some battery racks in installing the relay, which conducts or blocks a current flowing in the battery rack including a plurality of battery modules, so that a voltage smaller than a predetermined voltage limit value is applied to the battery rack, prevent a short-circuit phenomenon that occurs in the battery rack in which the relay is abnormally installed, by controlling an operation state of the relay before the battery rack and the relay form a short circuit, thereby preventing the battery rack from being damaged.

More particularly, an object of the present invention is to provide an apparatus, a system, and a method of preventing a battery rack from being damaged by measuring a voltage, which, when an installer abnormally installs a relay, so that a closed circuit, in which only a relay and a battery rack are connected without an external load, is configured, measure a voltage of the battery rack by a voltage measuring unit and detect a short-circuit phenomenon that may occur in the battery rack, determine that the short-circuit phenomenon occurs in the battery rack when a value of the measured voltage is smaller than a predetermined voltage limit value, and control a precharge relay and a main relay by a relay controller to block a current flowing in the battery rack, thereby preventing the battery rack from being damaged due to the short-circuit phenomenon.

Another object of the present invention is to provide an apparatus, a system, and a method of preventing a battery rack from being damaged by measuring a voltage, in which an apparatus for preventing a battery rack from being damaged by measuring a voltage is provided in one or more battery racks each in an energy storage device or a battery system that is connected with one or more battery racks and charges/discharges power, and which may individually perform a process of, on a corresponding battery rack, measuring a voltage value of the corresponding battery rack, comparing the measured voltage value with a predetermined voltage limit value, and controlling operation states of a precharge relay and a main relay of the corresponding battery rack according to a result of the comparison.

Technical Solution

An apparatus for preventing a battery rack from being damaged by measuring a voltage according to an exemplary embodiment of the present invention includes: a voltage measuring unit configured to measure a voltage value of a battery rack including a plurality of battery modules; a comparing unit configured to compare whether the voltage value measured by the voltage measuring unit is greater or smaller than a predetermined voltage limit value; and a relay controller configured to control operation states of a precharge relay and a main relay based on the comparison result value obtained by the comparing unit before the operation state of the main relay is changed from an off state to an on state after the operation state of the precharge relay is changed to the on state, in which the apparatus for preventing a battery rack from being damaged by measuring a voltage is provided in one or more battery racks each, and individually performs, on a corresponding battery rack, a process of measuring a voltage value of the corresponding battery rack, comparing the measured voltage value with a predetermined voltage limit value, and controlling operation states of a precharge relay and a main relay of the corresponding battery rack according to a result of the comparison.

In the exemplary embodiment, the precharge relay may be serially connected with a precharge resistor, of which a resistance value is determined according to a capacity of the battery rack, to decrease a current value of an overcurrent flowing in the battery rack.

In the exemplary embodiment, the voltage measuring unit may measure voltages applied to both ends of the battery rack, and transmit the measured voltage values to the comparing unit.

In the exemplary embodiment, when the voltage value received from the voltage measuring unit is smaller than the predetermined voltage limit value, the comparing unit may transmit a voltage shortfall signal to the relay controller.

In the exemplary embodiment, when the relay controller receives the voltage shortfall signal from the comparing unit, the relay controller may change the operation state of the precharge relay from the on state to the off state, and maintain the operation state of the main relay in the off state.

In the exemplary embodiment, the apparatus may be included in a battery management system for controlling the one or more battery racks.

A system for preventing a battery rack from being damaged by measuring a voltage according to another exemplary embodiment of the present invention includes: an apparatus for preventing a battery rack from being damaged by measuring a voltage in one or more battery racks each, the apparatus including: a voltage measuring unit configured to measure a voltage value of a battery rack including a plurality of battery modules; a comparing unit configured to compare whether the voltage value measured by the voltage measuring unit is greater or smaller than a predetermined voltage limit value; and a relay controller configured to control operation states of a precharge relay and a main relay based on the comparison result value obtained by the comparing unit before the operation state of the main relay is changed from an off state to an on state after the operation state of the precharge relay is changed to the on state, in which the system for preventing a battery rack from being damaged by measuring a voltage individually performs, on a corresponding battery rack, a process of measuring a voltage value of the corresponding battery rack, comparing the measured voltage value with a predetermined voltage limit value, and controlling operation states of a precharge relay and a main relay of the corresponding battery rack according to a result of the comparison.

In the exemplary embodiment, the precharge relay may be serially connected with a precharge resistor, of which a resistance value is determined according to a capacity of the battery rack, to decrease a current value of an overcurrent flowing in the battery rack.

In the exemplary embodiment, the voltage measuring unit may measure voltages applied to both ends of the battery rack, and transmit the measured voltage values to the comparing unit.

In the exemplary embodiment, when the voltage value received from the voltage measuring unit is smaller than the predetermined voltage limit value, the comparing unit may transmit a voltage shortfall signal to the relay controller.

In the exemplary embodiment, when the relay controller receives the voltage shortfall signal from the comparing unit, the relay controller may change the operation state of the precharge relay from the on state to the off state, and maintain the operation state of the main relay in the off state.

In the exemplary embodiment, the system may be included in a battery management system for controlling the one or more battery racks.

A method of preventing a battery rack from being damaged by measuring a voltage according to yet another exemplary embodiment of the present invention includes: (a) providing an apparatus for preventing a battery rack from being damaged by measuring a voltage, which includes a voltage measuring unit, a comparing unit, and a relay controller, in one or more battery racks each; and (b) individually performing, by the apparatus, on a corresponding battery rack, a process of measuring a voltage value of the corresponding battery rack, comparing the measured voltage value with a predetermined voltage limit value, and controlling operation states of a precharge relay and a main relay of the corresponding battery rack according to a result of the comparison, in which (b) includes: (b1) measuring, by the voltage measuring unit, a voltage value of the battery rack including a plurality of battery modules; (b2) comparing, by the comparing unit, whether the voltage value measured by the voltage measuring unit is greater or smaller than a predetermined voltage limit value; and (b3) controlling, by the relay controller, the operation states of the precharge relay and the main relay based on the comparison result value obtained by the comparing unit before the operation state of the main relay is changed from an off state to an on state after the operation state of the precharge relay is changed to the on state.

In the exemplary embodiment, (b1) may include measuring, by the voltage measuring unit, voltages applied to both ends of the battery rack, and transmitting the measured voltage values to the comparing unit.

In the exemplary embodiment, (b2) may further include transmitting, by the comparing unit, a voltage shortfall signal to the relay controller when the voltage value received from the voltage measuring unit is smaller than the predetermined voltage limit value.

In the exemplary embodiment, (b3) may include, when the relay controller receives the voltage shortfall signal from the comparing unit, changing, by the relay controller, the operation state of the precharge relay from the on state to the off state, and maintaining the operation state of the main relay in the off state.

Advantageous Effects

The apparatus, the system, and the method of preventing a battery rack from being damaged by measuring a voltage according to the exemplary embodiments of the present invention control operation states of the precharge relay and the main relay before a short-circuit phenomenon occurs in the battery rack when a measured voltage value of the battery rack is smaller than a predetermined voltage limit value, thereby blocking a current flowing in the battery rack in which the relay is abnormally installed. Accordingly, there is an effect of preventing a battery rack from being damaged and fire due to overcharging and overheating by preventing a short-circuit phenomenon that may occur in a battery rack.

Further, the present invention provides the apparatus for preventing a battery rack from being damaged by measuring a voltage in one or more battery racks each in an energy storage device or a battery system that is connected with one or more battery racks and charges/discharges power, and individually performs a process of, on a corresponding battery rack, measuring a voltage value of a corresponding battery rack and comparing the measured voltage value with a predetermined voltage limit value, and controlling operation states of a precharge relay and a main relay of the corresponding rack according to a result of the comparison, thereby achieving an effect of preventing charging capacitance imbalance between the battery racks due to a short-circuit phenomenon in some battery racks.

BEST MODE

The present invention will be described below with reference to the accompanying drawings. Herein, the detailed description of a known function and configuration that may make the purpose of the present invention unnecessarily ambiguous in describing the spirit of the present invention will be omitted. The Examples of the present invention are provided for more completely explaining the present invention to those skilled in the art. Accordingly, the shape, the size, etc., of elements in the figures may be exaggerated for explicit comprehension.

Throughout the specification and the claims, unless explicitly described to the contrary, the word "comprise" and variations such as "comprises" or "comprising" will be understood to imply the inclusion of stated elements but not the exclusion of any other elements.

In addition, the term " . . . unit" described in the specification means a unit for processing at least one function and operation and may be implemented by hardware components or software components and combinations thereof.

Figure 1:
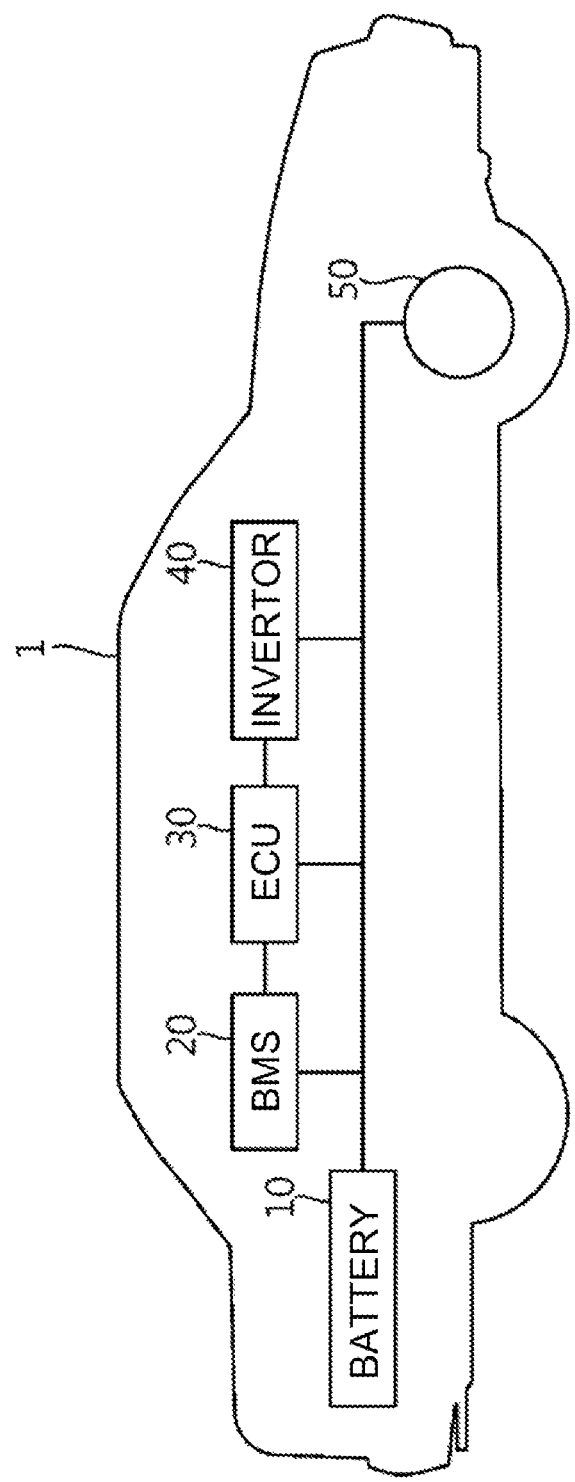
FIG. 1 is a diagram schematically illustrating an electric vehicle to which an apparatus for preventing a battery rack from being damaged by measuring a voltage according to an exemplary embodiment of the present invention is applicable.

FIG. 1 is a diagram schematically illustrating an electric vehicle to which an apparatus for preventing a battery rack from being damaged by measuring a voltage according to an exemplary embodiment of the present invention is applicable.

FIG. 1 illustrates an example in which an apparatus for preventing a battery rack from being damaged by measuring a voltage according to an exemplary embodiment of the present invention is applied to an electric vehicle, but as long as a rechargeable battery is applicable to a technical field, such as a mobile device, an energy storage system (ESS), or an uninterruptible power supply (UPS), in addition to an electric vehicle, an apparatus for preventing a battery rack from being damaged by measuring a voltage according to an exemplary embodiment of the present invention is applicable to any technical field.

An electric vehicle 1 may include a battery 10, a battery management system (BMS) 20, an electronic control unit (ECU) 30, an inverter 40, and a motor 50.

The battery 10 is an electric energy source for driving the electric vehicle 1 by providing driving force to the motor 50. The battery 10 may be charged or discharged by the inverter 40 according to driving of the motor 50 or an internal combustion engine (not illustrated).

Here, the kind of battery 10 is not particularly limited, and examples of the battery 10 may include a lithium ion battery, a lithium polymer battery, a nickel cadmium battery, a nickel hydrogen battery, a nickel zinc battery, and the like.

The BMS 20 estimates a state of the battery 10, and manages the battery 10 by using information on the estimated state. For example, the BMS 20 estimates and manages state information about the battery 10, such as a state of charging (SOC), a state of health (SOH), the amount of maximum input/output allowance power, and an output voltage. Further, charging or discharging of the battery 10 may be controlled by using the state information, and further, a replacement time of the battery 10 may be estimated.

Further, the BMS 20 may include an apparatus and a system for preventing a battery rack from being damaged by measuring a voltage which will be described below. It is possible to prevent the battery 10 from being damaged due to overheating caused by overcharging of the battery 10 or occurrence of a short-circuit phenomenon by the apparatus and system for preventing a battery rack from being damaged by measuring a voltage.

The ECU 30 is an electronic control device for controlling a state of the electric vehicle 1. For example, the ECU 30 determines a torque degree based on information about an accelerator, a brake, a speed, and the like, and controls the state of the electric vehicle 1 so that an output of the motor 50 corresponds to torque information.

Further, the ECU 30 transmits a control signal to the inverter 40 so that the battery 10 is charged or discharged based on the state information, such as an SOC and an SOH, of the battery 10 received from the BMS 20.

The inverter 40 makes the battery 10 be charged or discharged based on the control signal of the ECU 30.

The motor 50 drives the electric vehicle 1 based on control information (for example, the torque information) transmitted from the ECU 30 by using electric energy of the battery 10.

Figure 2:
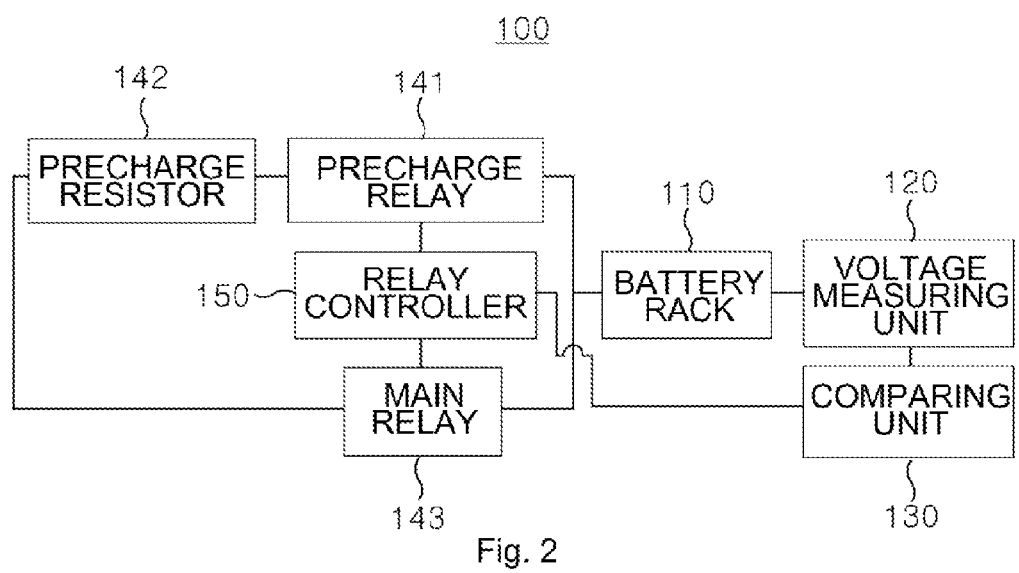
FIG. 2 is a block diagram illustrating a configuration of the apparatus for preventing a battery rack from being damaged by measuring a voltage according to an exemplary embodiment of the present invention.
Figure 3:
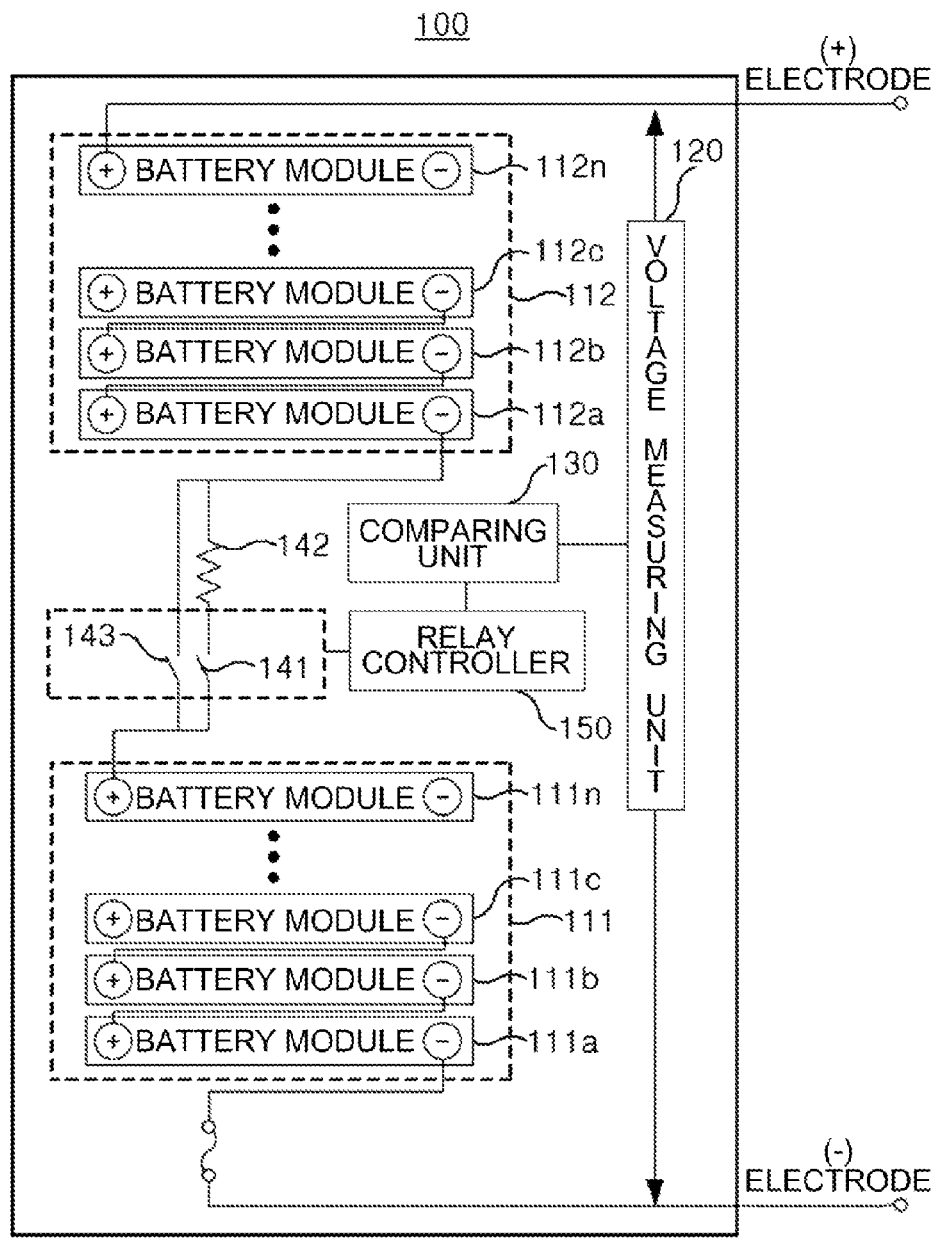
FIG. 3 is a diagram illustrating an example of a particular configuration of the apparatus for preventing a battery rack from being damaged by measuring a voltage according to an exemplary embodiment of the present invention.

FIG. 2 is a block diagram illustrating a configuration of the apparatus for preventing a battery rack from being damaged by measuring a voltage according to an exemplary embodiment of the present invention, and FIG. 3 is a diagram illustrating an example of a particular configuration of the apparatus for preventing a battery rack from being damaged by measuring a voltage according to an exemplary embodiment of the present invention.

Referring to FIGS. 2 and 3, an apparatus 100 for preventing a battery rack from being damaged by measuring a voltage may include a battery rack 110, a first battery rack 111, a second battery rack 112, a voltage measuring unit 120, a comparing unit 130, a precharge relay 141, a precharge resistor 142, a main relay 143, and a relay controller 150. The apparatus 100 for preventing a battery rack from being damaged by measuring a voltage, which is illustrated in FIGS. 2 and 3, is an exemplary embodiment, and constituent elements thereof are not limited to the exemplary embodiment illustrated in FIGS. 2 and 3, and may be added, changed, or removed as necessary.

The battery rack 110 may be charged by receiving power, or discharged by supplying electric energy charged in the battery rack 110 to a load. Here, the kind of battery rack 110 is not particularly limited, and may include a plurality of battery modules.

In one exemplary embodiment, the battery rack 110 may be included in the battery 10 illustrated in FIG. 1, and since the battery rack 110 may use a publicly known related art, a detailed description thereof will be omitted.

In the meantime, the first battery rack 111 and the second battery rack 112 illustrated in FIG. 3 may be included in the battery rack 110, and the battery modules 111a, 111b, . . . , and 111n, which are connected at a lower side based on the precharge relay 141, the precharge resistor 142, and the main relay 143 that are connected for preventing the battery rack 110 from being damaged, may be the constituent elements of the first battery rack 111, and the battery modules 112a, 112b, . . . , and 112n, which are connected at an upper side may be the constituent elements of the second battery rack 112. In this case, the voltage measuring unit 120, which will be described below, may be positioned to be in contact with a minus (−) electrode of the first battery rack 111 and a plus (+) electrode of the second battery rack 112 to measure a voltage.

The voltage measuring unit 120 may be positioned to be in contact with the aforementioned both ends (the plus (+) electrode and the minus (−) electrode) of the battery rack 110 and serve to measure a potential difference in a voltage applied to the battery rack 110. In the meantime, the voltage measuring units 120 may include one or more switch elements, capacitors, conductive lines, and the like in order to measure a voltage of the battery rack 110. The voltage value measured by the voltage measuring unit 120 may be transmitted to the comparing unit 130 which will be described below.

The comparing unit 130 may serve to receive the measured voltage value from the voltage measuring unit 120, and compare and determine the received measured voltage value with a predetermined voltage limit value.

Here, a voltage value measured in the battery rack 110, in which the battery rack 110 is normally connected with the precharge relay 141, the precharge resistor 142, and the main relay 143, which will be described below, so that a short circuit is not incurred, may be initially set as the predetermined voltage limit value, or the predetermined voltage limit value may be a value settable by a user. For example, the predetermined voltage limit value may be 400 V.

Next, when the measured voltage value is smaller than the predetermined voltage limit value, the comparing unit 130 may transmit a voltage shortfall signal to the relay controller 150, which will be described below, and when the measured voltage value is not smaller than the predetermined voltage limit value, the comparing unit 130 does not transmit the voltage shortfall signal.

In one exemplary embodiment, the comparing unit 130 may further include a separate stabilizer (not illustrated, for example, a resistor having a high resistance value) similar to the voltage measuring unit 120, and thus may be configured to autonomously protect an inner part thereof from a high voltage.

The precharge relay 141 and the precharge resistor 142 may be serially connected, and the main relay 143 may be connected in parallel with the precharge relay 141 and the precharge resistor 142, which are serially connected, and serve to conduct or block the current flowing in the battery rack 110. Operation states of the precharge relay 141 and the main relay 143 may correspond to any one of an on state, in which a pair of conductive lines is in contact with each other, and an off state, in which a pair of conductive lines is spaced apart from each other, and when an operation state of any one or more of the precharge relay 141 and the main relay 143 corresponds to the on state, the current flowing in the battery rack 110 is conducted, and when all of the operation states of the precharge relay 141 and the main relay 143 correspond to the off state, the current flowing in the battery rack 110 may be blocked.

In the meantime, in order to protect the battery rack 110 from a surge current at an initial stage where power is supplied to the battery rack 110, the operation state of the precharge relay 141 may be changed to the on state, and when the operation state of the precharge relay 141 is changed to the on state, the surge current flows to the precharge resistor 142 serially connected with the precharge relay 141, thereby protecting the battery rack 110. After the operation state of the precharge relay 141 is changed to the on state, the operation state of the main relay 143 may be changed to the on state after a predetermined time (for example, a time corresponding to 1 s), and the comparing unit 130 may serve to compare and determine the voltage value measured by the voltage measuring unit 120 with the predetermined voltage limit value from the change of the operation state of the precharge relay 141 to the on state until the operation state of the main relay 143 is changed to the on state.

Here, a voltage value measured in the battery rack 110, in which the battery rack 110 is normally connected with the precharge relay 141, the precharge resistor 142, and the main relay 143, so that a short circuit is not incurred, may be initially set as the predetermined voltage limit value, or the predetermined voltage limit value may be a value settable by a user. For example, the predetermined voltage limit value may be 400 V.

The operation state of the precharge relay 141 is changed to the off state after a predetermined time (for example, a time corresponding to 1 s) after the operation states of the precharge relay 141 and the main relay 143 are changed to the on state, so that power supplied to the battery rack 110 may be supplied without passing through by the precharge resistor 142.

The relay controller 150 may be connected with the comparing unit 130, the precharge relay 141, the precharge resistor 142, and the main relay 143, and when the relay controller 150 receives the voltage shortfall signal from the comparing unit 130, the relay controller 150 may serve to change the operation state of the precharge relay 141 from the on state to the off state, and maintain the operation state of the main relay 143 in the off state. When the operation states of the precharge relay 141 and the main relay 143 are the off state, the current flowing in the battery rack 110 may be blocked.

On the contrary, when the relay controller 150 does not receive the voltage shortfall signal from the comparing unit 130, the relay controller 150 may not control the operation states of the precharge relay 141 and the main relay 143.

Figure 4:
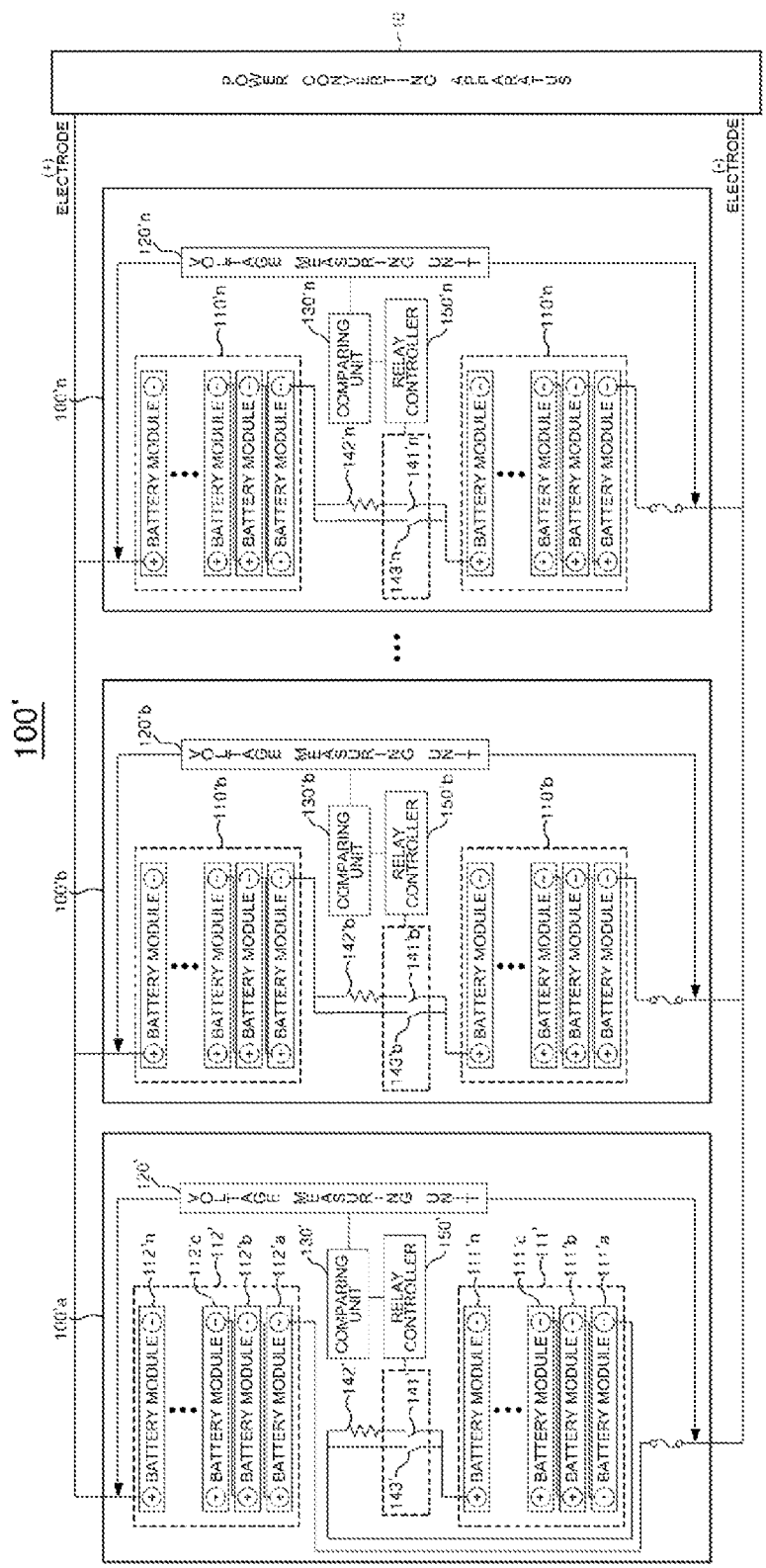
FIG. 4 is a diagram illustrating an example of the case where an apparatus for preventing a battery rack from being damaged by measuring a voltage is operated in a system for preventing a battery rack from being damaged by measuring a voltage.

FIG. 4 is a diagram illustrating an example of the case where an apparatus for preventing a battery rack from being damaged by measuring a voltage is operated in a system for preventing a battery rack from being damaged by measuring a voltage.

Referring to FIG. 4, in system 100' for preventing a battery rack from being damaged by measuring a voltage according to an exemplary embodiment of the present invention, the apparatuses 100a', . . . , and 100'n for preventing a battery rack from being damaged by measuring a voltage may be provided in one or more battery racks 111', 110'b, . . . , and 110'n, respectively.

The system 100' for preventing a battery rack from being damaged by measuring a voltage may individually perform, on the first and second battery racks 111' and 112' provided with the apparatus 100'a for preventing a battery rack from being damaged by measuring a voltage, a process of measuring voltage values of the first and second battery racks 111' and 112' and comparing the measured voltage values with a predetermined voltage limit value, and controlling operation states of a precharge relay 141' and a main relay 143' of the first and second battery racks 111' and 112' according to a result of the comparison.

Similar to the individual performance of the process on each of the first and second battery racks 111' and 112' provided with the apparatus 100'a for preventing a battery rack from being damaged by measuring a voltage, the aforementioned process may be individually performed on the battery racks 110'b, . . . , and 110'n provided with the apparatuses 100'b, . . . , and 100'n for preventing a battery rack from being damaged by measuring a voltage, respectively.

Through each individual process of the apparatuses 100'a, . . . , and 100'n for preventing a battery rack from being damaged by measuring a voltage, it is possible to easily recognize only the battery rack in which a precharge relay, a precharge resistor, and a main relay are abnormally installed, in an energy storage device or a battery system in which one or more battery racks are connected to charge/discharge power, and it is possible to continuously charge/discharge the energy storage device or the battery system by individually blocking only the precharge relay and the main relay of the corresponding battery rack without blocking all of the current of the one or more battery racks which are connected with each other.

Next, the apparatus 100'a for preventing a battery rack from being damaged by measuring a voltage of the first battery rack 111', in which a precharge relay 141', the precharge resistor 142', and the main relay 143' are abnormally installed, will be described in more detail.

The apparatus 100' a for preventing a battery rack from being damaged by measuring a voltage may be an example in which the first battery rack 111' is abnormally connected with the precharge relay 141', the precharge resistor 142', and the main relay 143' to form a closed circuit without an external load. The precharge relay 141' and the precharge resistor 142' may be serially connected in the closed circuit and serve to prevent a short-circuit phenomenon when an operation state of the precharge relay 141' is changed from an off state to an on state.

The second battery rack 112' may be connected with precharge resistors 142'b, . . . , and 142'n of the apparatuses 100'b, . . . , and 100'n for preventing a battery rack from being damaged by measuring a voltage and serve to prevent a short-circuit phenomenon.

When the apparatus 100'a for preventing a battery rack from being damaged by measuring a voltage receives power from a power converting apparatus 200, the power may be charged in the second battery rack 112', except for the first battery rack 111', and a voltage measuring unit 120'a may serve to measure a voltage applied to the second battery rack 112', except for the first battery rack 111'. The voltage value measured by the voltage measuring unit 120' is a value obtained by measuring the voltage applied only to the second battery rack 112', except for the first battery rack 111', so that the voltage value measured by the voltage measuring unit 120' may be smaller than voltage values measured by other voltage measuring units 120'b, . . . , and 120'n.

When an operation state of the main relay 143' is changed from an off state to an on state, a short-circuit phenomenon may occur in the closed circuit. In order to prevent the short-circuit phenomenon, a comparing unit 130' may serve to compare and determine a voltage value measured by the voltage measuring unit 120' with a predetermined voltage limit value, and transmit a voltage shortfall signal to a relay controller 150' when the measured voltage value is smaller than the predetermined voltage limit value. The relay controller 150' receiving the voltage shortfall signal may serve to prevent the short-circuit phenomenon that occurs in the first battery rack 111', by maintaining an operation state of the precharge relay 141' in an off state before an operation state of the main relay 143' is changed from the off state to an on state.

Further, when the short-circuit phenomenon occurs in the first battery rack 111', the relay controller 150' may serve to prevent damage due to overcharging, overheating, or swelling that occurs by a variation of each charging speed by a capacitance deviation between the battery racks 111', 112', 110'b, . . . , and 110'n.

Here, a voltage value obtained by measuring both ends of a minus (−) electrode of the first battery rack 111' and a plus (+) electrode of the second battery rack 112', in which the first battery rack 110' and the second battery rack 112' are normally connected with the precharge relay 141', the precharge resistor 142', and the main relay 143', so that a short circuit is not incurred, may be initially set as the predetermined voltage limit value, or the predetermined voltage limit value may be a value settable by a user. For example, the predetermined voltage limit value may be 400 V.

Figure 5:
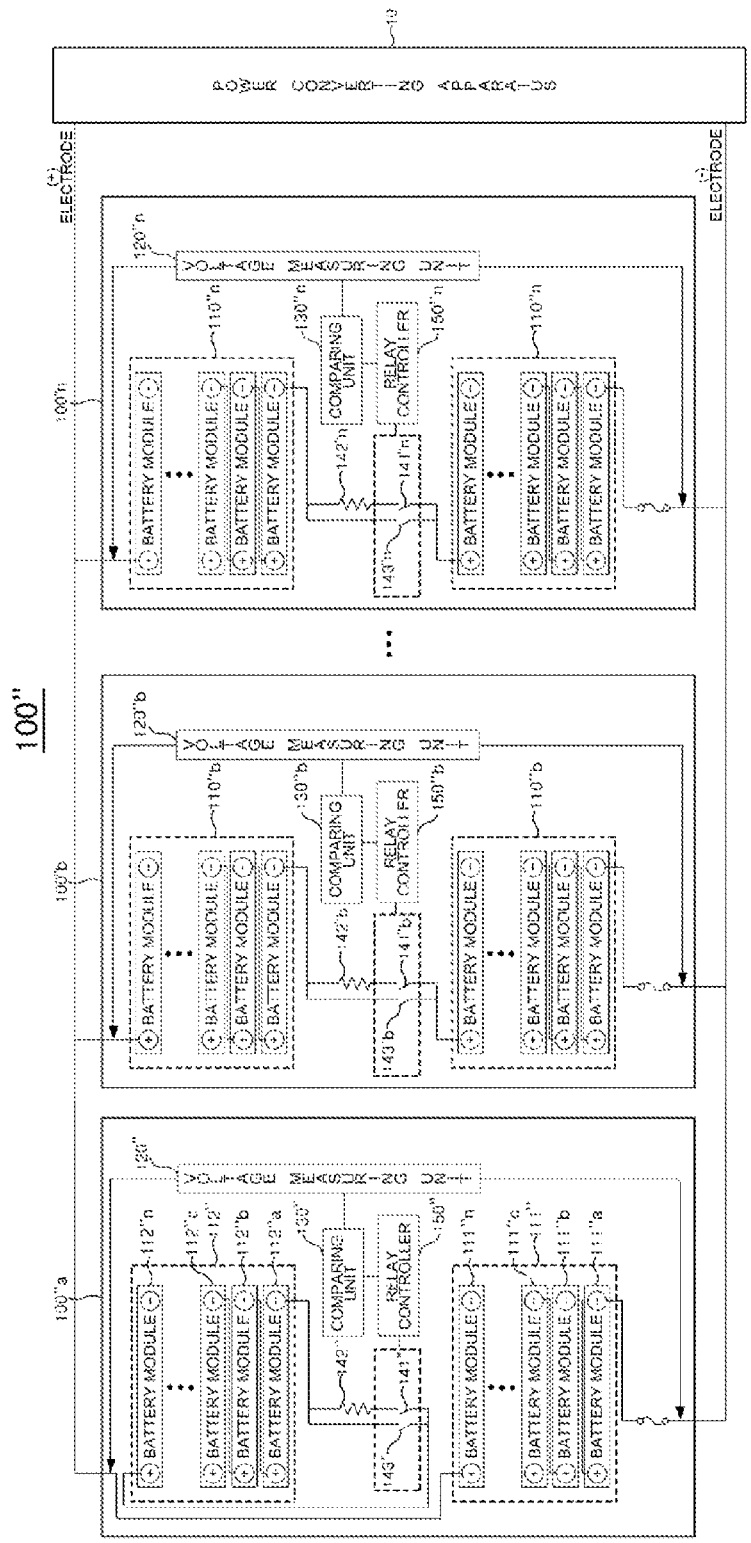
FIG. 5 is a diagram illustrating another example of the case where an apparatus for preventing a battery rack from being damaged by measuring a voltage is operated in a system for preventing a battery rack from being damaged by measuring a voltage.

FIG. 5 is a diagram illustrating another example of the case where an apparatus for preventing a battery rack from being damaged by measuring a voltage is operated in a system for preventing a battery rack from being damaged by measuring a voltage.

Referring to FIG. 5, in a system 100" for preventing a battery rack from being damaged by measuring a voltage according to an exemplary embodiment of the present invention, apparatuses 100"a, . . . , and 100"n for preventing a battery rack from being damaged by measuring a voltage may be provided in one or more battery racks 112", 110"b, . . . , and 110"n, respectively.

The system 100" for preventing a battery rack from being damaged by measuring a voltage may individually perform, on the first and second battery racks 111" and 112" provided with the apparatus 100"a for preventing a battery rack from being damaged by measuring a voltage, a process of measuring voltage values of the first and second battery racks 111" and 112" and comparing the measured voltage values with a predetermined voltage limit value, and controlling operation states of a precharge relay 141" and a main relay 143" of the first and second battery racks 111" and 112" according to a result of the comparison.

Similar to the individual performance of the process on the first and second battery racks 111" and 112" provided with the apparatus 100"a for preventing a battery rack from being damaged by measuring a voltage, the aforementioned process may be individually performed on the battery racks 110"b, . . . , and 110"n provided with the apparatuses 100"b, . . . , and 100"n for preventing a battery rack from being damaged by measuring a voltage, respectively.

Through each individual process of the apparatuses 100"a, . . . , and 100"n for preventing a battery rack from being damaged by measuring a voltage, it is possible to easily recognize only the battery rack in which a precharge relay, a precharge resistor, and a main relay are abnormally installed, in an energy storage device or a battery system in which one or more battery racks are connected to charge/discharge power, and it is possible to continuously charge/discharge the energy storage device or the battery system by individually blocking only the precharge relay and the main relay of the corresponding battery rack without blocking all of the current of the one or more battery racks which are connected with each other.

Next, the apparatus 100'a for preventing a battery rack from being damaged by measuring a voltage of the first battery rack 111', in which the precharge relay 141', the precharge resistor 142', and the main relay 143' are abnormally installed, will be described in more detail.

The apparatus 100"a for preventing a battery rack from being damaged by measuring a voltage may be an example in which the second battery rack 112" is abnormally connected with the precharge relay 141", the precharge resistor 142", and the main relay 143" to form a closed circuit without an external load. The precharge relay 141" and the precharge resistor 142" may be serially connected in the closed circuit and serve to prevent a short-circuit phenomenon when an operation state of the precharge relay 141" is changed from an off state to an on state.

The first battery rack 111" may be connected with precharge resistors 142"b, . . . , and 142"n of the apparatuses 100"b, . . . , and 100"n for preventing a battery rack from being damaged by measuring a voltage and serve to prevent a short-circuit phenomenon.

When the apparatus 100" for preventing a battery rack from being damaged by measuring a voltage receives power from a power converting apparatus 200, the power may be charged in the first battery rack 111", except for the second battery rack 112", and a voltage measuring unit 120" may serve to measure a voltage applied to the first battery rack 111", except for the second battery rack 112". The voltage value measured by the voltage measuring unit 120" is a value obtained by measuring the voltage applied only to the first battery rack 111", except for the second battery rack 112", so that the voltage value measured by the voltage measuring unit 120" may be smaller than voltage values measured by other voltage measuring units 120"b, . . . , and 120"n.

When an operation state of the main relay 143" is changed from an off state to an on state, a short-circuit phenomenon may occur in the closed circuit. In order to prevent the short-circuit phenomenon, a comparing unit 130" may serve to compare and determine a voltage value measured by the voltage measuring unit 120" with a predetermined voltage limit value, and transmit a voltage shortfall signal to a relay controller 150" when the measured voltage value is smaller than the predetermined voltage limit value. The relay controller 150" receiving the voltage shortfall signal may serve to prevent the short-circuit phenomenon that occurs in the second battery rack 112", by changing an operation state of the precharge relay 141" from an on state to an off state and maintaining an operation state of the main relay 143" in an off state before an operation state of the main relay 143" is changed from the off state to the on state.

Further, when the short-circuit phenomenon occurs in the second battery rack 112", the relay controller 150" may serve to prevent damage due to overcharging, overheating, or swelling that occurs due to a variation of each charging speed caused by a capacitance deviation between the battery racks 111", 112", 110"b, . . . , and 110"n.

Here, a voltage value measured at both ends of a minus (−) electrode of the first battery rack 111" and a plus (+) electrode of the second battery rack 112", in which the first battery rack 111" and the second battery rack 112" are normally connected with the precharge relay 141", the precharge resistor 142", and the main relay 143", so that a short circuit is not incurred, may be initially set as the predetermined voltage limit value, or the predetermined voltage limit value may be a value settable by a user. For example, the predetermined voltage limit value may be 400 V.

Figure 6:
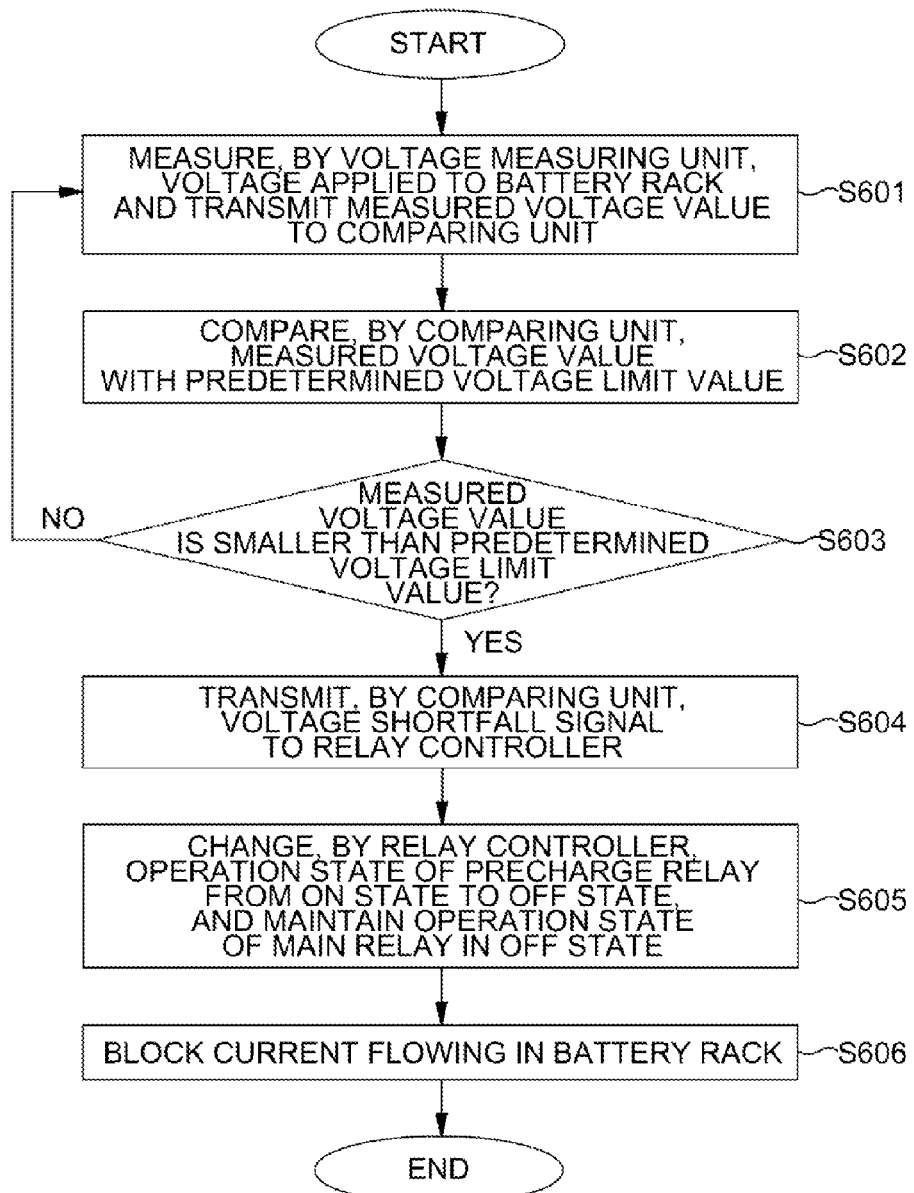
FIG. 6 is a flowchart sequentially illustrating a method of preventing a battery rack from being damaged by measuring a voltage according to an exemplary embodiment of the present invention.

FIG. 6 is a flowchart sequentially illustrating a method of preventing a battery rack from being damaged by measuring a voltage according to an exemplary embodiment of the present invention.

Referring to FIG. 6, first, the voltage measuring unit 120 measures a voltage applied to both ends of the battery rack 110 (the plus (+) electrode and the minus (−) electrode), and transmits the measured voltage value to the comparing unit 130 (S601).

Next, the comparing unit 130 compares and determines whether the measured voltage value received through the voltage measuring unit 120 is smaller than a predetermined voltage limit value (S602).

Here, a voltage value measured in the battery rack 110, in which the battery rack 110 is normally connected with the precharge relay 141, the precharge resistor 142, and the main relay 143, which will be described below, so that a short circuit is not incurred, may be initially set as the predetermined voltage limit value, or the predetermined voltage limit value may be a value settable by a user. For example, the predetermined voltage limit value may be 400 V.

When the comparison result value determined by the comparing unit 130 is smaller than the predetermined voltage limit value (S603), the comparing unit 130 transmits a voltage shortfall signal to the relay controller 150 (S604).

By contrast, when the comparison result value determined by the comparing unit 130 is not smaller than the predetermined voltage limit value, the process returns to the beginning.

The relay controller 150 receives the voltage shortfall signal and changes an operation state of the precharge relay 141 from an on state to an off state, and maintains an operation state of the main relay 143 in the off state before an operation state of the main relay 143 is changed from the off state to the on state (S605).

As a result, the operation states of the precharge relay 141 and the main relay 143 become the off state, thereby blocking a current flowing in the battery rack 110 (S606).

The present invention has been described with reference to the exemplary embodiments, but those skilled in the art may understand that the present invention may be variously modified and changed within the scope without departing from the spirit and the area of the present invention described in the accompanying claims.

The invention claimed is:

1. An apparatus for preventing a battery rack from being damaged by measuring a voltage, the apparatus comprising:
   a voltage measuring unit configured to measure the voltage of the battery rack including a plurality of battery modules;
   a comparing unit configured to compare whether a value of the voltage measured by the voltage measuring unit is greater or smaller than a predetermined voltage limit value; and
   a relay controller configured to control operation states of a precharge relay and a main relay based on the comparison result measured voltage value obtained by the comparing unit before the operation state of the main relay is changed from an off state to an on state after the operation state of the precharge relay is changed to the on state,
   wherein the apparatus for preventing the battery rack from being damaged by measuring the voltage is provided in one or more battery racks each, and individually measures a voltage of the corresponding battery rack, compares a value of the measured voltage of the corresponding battery rack with a predetermined voltage limit value, and controls operation states of a precharge relay and a main relay of the corresponding battery rack according to a result of the comparison result measured voltage value for the corresponding battery rack,
   wherein when the value of the voltage measured by the voltage measuring unit is smaller than the predetermined voltage limit value, the comparing unit transmits a voltage shortfall signal to the relay controller, and
   wherein when the relay controller receives the voltage shortfall signal from the comparing unit, the relay controller changes the operation state of the precharge relay from the on state to the off state, and maintains the operation state of the main relay in the off state.

2. The apparatus of claim 1, wherein the precharge relay is serially connected with a precharge resistor, of which a resistance value is determined according to a capacity of the battery rack, to decrease a current value of an overcurrent flowing in the battery rack.

3. The apparatus of claim 1, wherein the voltage measuring unit measures voltages applied to both ends of the battery rack, and transmits values of the measured voltages to the comparing unit.

4. The apparatus of claim 1, wherein the apparatus is included in a battery management system (BMS) for controlling the one or more battery racks.

5. The apparatus of claim 1, wherein the apparatus individually controls operation states of the precharge relay and the main relay connected between an input of the corresponding battery rack and an output another battery rack adjacent to the corresponding battery rack, according to the result of the comparison result measured voltage value for the corresponding battery rack.

6. A system for preventing a battery rack from being damaged by measuring a voltage, the system comprising:
   an apparatus comprising:
      a voltage measuring unit configured to measure the voltage of the battery rack including a plurality of battery modules;
      a comparing unit configured to compare whether a value of the voltage measured by the voltage measuring unit is greater or smaller than a predetermined voltage limit value; and
      a relay controller configured to control operation states of a precharge relay and a main relay based on the comparison result measured voltage value obtained by the comparing unit before the operation state of the main relay is changed from an off state to an on state alter the operation state of the precharge relay is changed to the on state,
   wherein the system for preventing the battery rack from being damaged by measuring the voltage individually measures a voltage of a corresponding battery rack, compares a value of the measured voltage of the corresponding battery rack with a predetermined voltage limit value, and controls operation states of a precharge relay and a main relay of the corresponding battery rack according to a result of the comparison result measured voltage value for the corresponding battery rack,
   wherein when the value of the voltage measured by the voltage measuring unit is smaller than the predetermined voltage limit value, the comparing unit transmits a voltage shortfall signal to the relay controller, and
   wherein when the relay controller receives the voltage shortfall signal from the comparing unit, the relay controller changes the operation state of the precharge relay from the on state to the off state, and maintains the operation state of the main relay in the off state.

7. The system of claim 6, wherein the precharge relay is serially connected with a precharge resistor, of which a resistance value is determined according to a capacity of the battery rack, to decrease a current value of an overcurrent flowing in the battery rack.

8. The system of claim 6, wherein the voltage measuring unit measures voltages applied to both ends of the battery rack, and transmits values of the measured voltages to the comparing unit.

9. The system of claim 6, wherein the system is included in a battery management system (BMS) for controlling the one or more battery racks.

10. A method of preventing a battery rack being damaged by measuring a voltage, the method comprising:
   individually performing, by an apparatus, on a corresponding battery rack among one or more battery racks each, measuring of a voltage of the corresponding battery rack, comparing of a value of the measured voltage with a predetermined voltage limit value, and controlling of operation states of a precharge relay and a main relay of the corresponding battery rack according to a result of the comparison for the corresponding battery rack, wherein the performing includes:
   measuring, by a voltage measuring unit in the apparatus, the voltage of the battery rack including a plurality of battery modules;
   comparing, by a comparing unit in the apparatus, whether a value of the voltage measured by the voltage measuring unit is greater or smaller than a predetermined voltage limit value; and
   controlling, by a relay controller in the apparatus, operation states of a precharge relay and a main relay of the battery rack based on the a result of the comparison obtained by the comparing unit before the operation state of the main relay is changed from an off state to an on state after the operation state of the precharge relay is changed to the on state, wherein the comparing of whether the value of the voltage is greater or smaller than the predetermined voltage limit value further includes transmitting, by the comparing unit, a voltage shortfall signal to the relay controller when the value of the voltage measured by the voltage measuring unit is smaller than the predetermined voltage limit value, and wherein the controlling of the operation states further includes, when the relay controller receives the voltage shortfall signal from the comparing unit, changing, by the relay controller, the operation state of the precharge relay from the on state to the off state, and maintaining the operation state of the main relay in the off state.

11. The method of claim 10, wherein the measuring of the voltage of the battery rack further includes measuring, by the voltage measuring unit, voltages applied to both ends of the battery rack, and transmitting values of the measured voltages to the comparing unit.

* * * * *